United States Patent Office 2,960,860
Patented Nov. 22, 1960

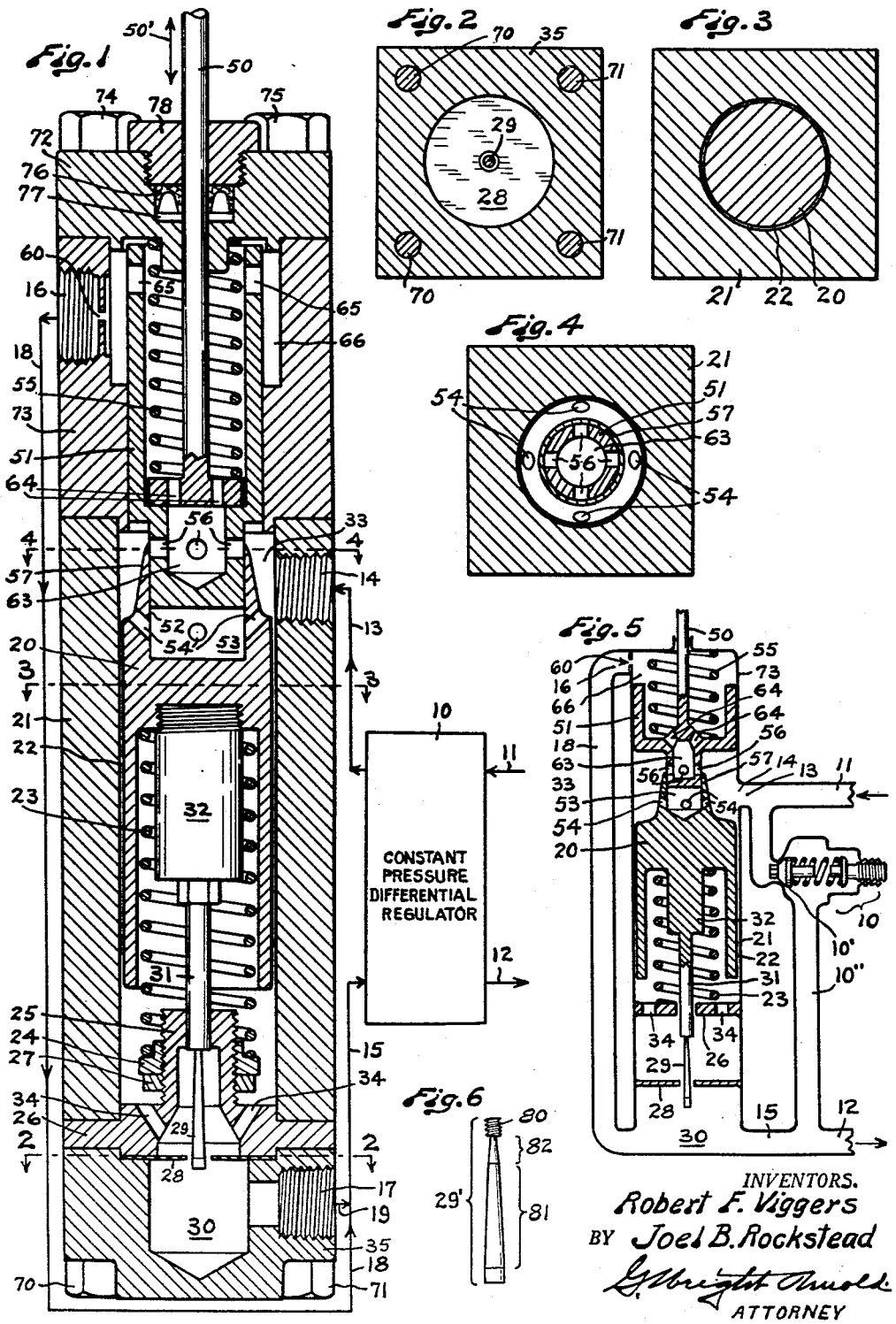

2,960,860

VISCOSIMETER HAVING VARIABLE SENSITIVITY AND HYDRAULIC SERVO OUTPUT

Robert F. Viggers and Joel B. Rockstead, Seattle, Wash., assignors, by mesne assignments, to Midland-Ross Corporation, Cleveland, Ohio, a corporation of Ohio Filed July 11, 1956, Ser. No. 597,269

17 Claims. (Cl. 73—55)

The present invention relates to an improved viscosimeter mechanism and more particularly relates to a viscosity sensing mechanism exhibiting increased sensitivity to incremental changes in viscosity of a liquid under test. Conjunctively, the present invention also relates to an improved hydraulic servo mechanism for use in combination with a viscosimeter, adapted to utilize the pressure of the liquid under test to generate a large energy mechanical output signal without loading the viscosity sensing elements of the viscosimeter.

The viscosimeter of the present invention and the hydraulic servo mechanism employed in conjunction therewith has wide and general application in industrial process control instrumentation or similar operations where the viscosity of a liquid is monitored continuously and a control signal output developed from incremental changes or errors in viscosity, which control signal output can be readily utilized to accomplish automatic viscosity regulation.

In its general aspects, the viscosimeter and/or hydraulic servo output system of the present invention are capable of application wherever the viscosity of a liquid is to be monitored continuously and a corrective signal generated to control associated equipments to compensate for viscosity errors. Typical systems for viscosity regulation of engine lubricating oil are found in Booth U.S. Patent 2,400,910 and Hoffstrom U.S. Patent 2,489,136, while a typical application of viscosity regulation in industrial process control is found in Thomson et al. U.S. Patent 2,435,416. The utility of the present invention in these and other systems of a comparable character will be evident to those skilled in the art from the following description thereof.

More particularly, the present invention has found specific application as the viscosity sensing subassembly in dual fuel control systems for engines burning diesel-type fuel, such as disclosed in the copending application S.N. 597,182 of Joel B. Rockstead entitled "Dual Fuel Control Systems for Engines Burning Diesel-Type Fuels," filed herewith.

In utilization of so-called heavy fuels in engines burning diesel-type fuel, diesel fuel is delivered to the engine for engine operation below a predetermined engine power output, and the engine is shifted to heated heavy fuel at power outputs above such predetermined level. The viscosity of the heavy fuel is regulated by the degree of heating thereof and, in the dual fuel system presented in said copending application, is controlled cooperatively by an engine performance factor sensing unit (sensing engine speed or generated load) and by a fuel viscosity sensing unit, each such units generating an output signal in turn controlling a throttle valve regulating the degree of heat input to the heavy fuel.

A viscosimeter and hydraulic servo output mechanism according to the present invention is ideally suited for use in such dual fuel system because of the increased sensitivity thereof in terms of the relatively large mechanical movement generated as a control output from a given incremental change in viscosity of the fuel under test and because of the substantially complete isolation of the viscosity sensing elements from such mechanical output by the novel hydraulic servo mechanism forming part of the present invention.

Thus, it is a primary object of the present invention to provide a viscosimeter of improved sensitivity.

It is a further object of the present invention to provide in conjunction with a viscosimeter, a hydraulic servo mechanism effectively isolating the viscosity sensing elements of the viscosimeter from the control signal output thereof. A related and more specific object of the present invention involves, in such hydraulic servo mechanism, utilization of the pressure of the liquid under test as the source of energy for the control signal output.

A more specific object of the present invention is to provide a viscosimeter of increased sensitivity having a piston type laminar flow section and a constricted orifice of variable cross sectional area in series across a constant pressure drop of the liquid under test. A related and more specific object of the present invention is to provide a viscosimeter wherein the area of said constricted orifice is varied directly in proportion with the degree of viscous drag in said piston type laminar flow section to amplify the degree of movement of the laminar flow section piston with incremental changes in viscosity of the liquid under test. A further related and more specific object of the present invention is to provide such variable area constricted orifice by means of a fixed orifice having arranged therein a tapered pin mechanically connected to said laminar flow section piston. Yet another related object of this aspect of the present invention involves providing such tapered pin with a nonlinear taper along a portion of its length, the degree of taper in such portion rendering the movement of said laminar flow section piston unstable along a portion of its stroke, thus providing a snap-action mechanical output and achieving more positive control of external equipment when a predetermined viscosity of the liquid under test exists.

These and other objects of the present invention will be apparent from the following description thereof, wherein like numerals designate like parts and wherein:

Figure 1 presents a view in vertical cross section, with certain elements shown in elevation, illustrating a typical embodiment of the present invention, the constant pressure differential regulator associated therewith being shown diagrammatically and external hydraulic communication lines being shown schematically.

Fig. 2 is a cross section view on a somewhat reduced scale, taken substantially along 2—2 of Figure 1.

Fig. 3 is a cross section view on a somewhat reduced scale, taken substantially along 3—3 of Figure 1.

Fig. 4 is a cross section view on a somewhat reduced scale, taken substantially along line 4—4 of Figure 1.

Fig. 5 is a diagrammatic view, showing in somewhat simplified form the functional arrangement of elements of the embodiment of the invention illustrated in Figure 1.

Fig. 6 is an enlarged detail view of a modified form of tapered pin for use in the form of the invention illustrated in Figure 1, wherein the taper of a portion thereof is increased to provide a snap-action output.

Turning to a more specific consideration of the embodiment of the present invention illustrated in Figs. 1 through 4, the viscosity sensing elements and associated hydraulic servo mechanism operate in conjunction with a constant pressure differential regulator 10, conventional per se, serving to maintain a constant pressure differential between inlet line 11 and outlet line 12 of the liquid under test. The high pressure outlet line 13 from constant pressure differential regulator 10 delivers the liquid under test to inlet 14, common to the viscosity sensing subassembly and the hydraulic servo subassembly, and the low pressure input line 15 to the constant pressure differential regulator is connected to outlet 16 of the servo subassembly and outlet 17 of the viscosity sensing subassembly by respective lines 18 and 19, as shown.

The viscosity sensing subassembly includes a laminar flow section comprising spring pressed piston 20 dimensioned to provide between said piston 20 and laminar flow section housing 21 an annular laminar flow passageway 22. Laminar flow section piston 20 is urged upwardly against the drag of the liquid under test flowing through said laminar flow passageway 22 by spring 23, resting against spring seat 24 in turn adjustably mounted on threaded sleeve 25 of partition plate 26 and locked thereon by means of lock nut 27. Arranged below partition plate 26 is an annular constricted orifice of variable cross sectional dimension formed by fixed orifice plate 28 and tapered pin 29 threadedly mounted on shaft 31, in turn connected to piston 20 through spring guide 32.

Liquid under test is delivered at relatively high pressure to inlet 14 and passes from head area 33 of piston 20 through the annular laminar flow passageway 22, thence through orifices 34 in partition plate 26 and through the annular constricted orifice formed by orifice plate 28 and tapered pin 29 to outlet chamber 30.

It is the function of the variable constricted orifice formed by orifice plate 28 and tapered pin 29 to render the positioning of laminar flow piston 20 more sensitive to incremental changes in viscosity of the liquid under test. In a typical embodiment of the viscosity sensing subassembly, with a liquid inlet pressure of 60 p.s.i. a pressure differential between lines 11 and 12 of 20 p.s.i., with the lateral dimension of laminar flow passageway 22 being .015 inch, with the area of piston 20 being 1 sq. inch and the total cross sectional area of said passageway 22 being about .06 sq. inch and with the cross sectional area of the variable constricted orifice formed by said orifice plate 28 and said tapered pin 29 varying from about .003 to .005 sq. inch depending upon the position of tapered pin 29 therein, the viscosity sensing elements were sensitive to liquid viscosity in the range from about 6 to about 8 centipoises. Thus, an incremental change of fuel viscosity of only 2 centipoises was necessary to shift piston 20 from one extent of its travel to the other, markedly increasing the incremental sensitivity of the viscosity sensing subassembly in terms of the viscosity error necessary to generate a given degree of movement of piston 20.

Such increase in sensitivity is effected generally in the following manner. Since the pressure drop between inlet 14 and outlet 17 in housing end 35 is constant, the total pressure drop through laminar flow passageway 22 and through the variable orifice remains constant. For relatively higher viscosity liquid, piston 20 is moved to a relatively low position in housing 21 and the effective cross sectional area of the variable orifice is relatively increased, which in turn places a greater proportion of the pressure drop across said laminar flow passageway 22 and thereby increases the tendency of piston 20 to move downwardly at such higher viscosity. Conversely, with a decrease in liquid viscosity, piston 22 moves upwardly and the effective cross sectional area of the variable orifice is relatively decreased, which in turn places a lesser proportion of the pressure drop across laminar flow passageway 22 and thereby increases the tendency of piston 20 to move upwardly.

It is thus evident that the viscosity sensing subassembly of the type presented in Figures 1, 2 and 3 is effectively more sensitive to incremental changes in liquid viscosity, in terms of the generated increment of movement of laminar flow piston 22 than would be the case if the constricted orifice were of fixed dimension or entirely removed. The incremental viscosity sensitive control output available from relative movement of piston 20 is connected through a hydraulic servo system, according to the present invention, to output rod 50, movement of which is schematically indicated at 50', through the following hydraulic servo mechanism.

Piston 51 is connected to said output rod 50 and reciprocably arranged with respect to cylinder 52 in turn provided in the head portion of laminar flow piston 20, inner head area 53 being in communication with inlet orifice 14 and outer head area 33 through orifices 54 so that the inlet fluid pressure present in both inner head area 53 and outer head area 33 tends to force piston 51 against compression spring 55 and tends to force output rod 50 upwardly.

In a given servo control condition, assuming the viscosity sensing subassembly is in operation and piston 20 moves slightly upwardly, orifices 56 laterally arranged in piston 51 are partially in communication with inlet 14 and tend to be closed off by tapered extension 57 forming a part of the head of piston 20. When relatively closed, orifices 56 cause a reduction in the liquid pressure in area 63 and the inlet pressure in areas 33 and 53 produce an upward movement to piston 51 and output rod 50. Such upward movement continues until orifices 56 again partially clear extension 57 to the point where an equilibrium condition exists with the pressure of spring 55 and the pressure in area 63 balancing the inlet liquid pressure in outer head area 33 and inner head area 53, at which point the upward movement of piston 51 and output rod 50 ceases until further change in position of laminar flow piston 20. Conversely, with the downward movement of piston 20, orifices 56 become relatively open and spring 55 with the increased pressure in area 63 pushes piston 51 downwardly until the equilibrium position between orifices 56 and extension 57 is again established. Thus, output rod 50 is moved by energy from the hydraulic pressure of the liquid under test at inlet 14, and the viscosity sensitive movement of laminar flow piston 20 merely effect a control of such hydraulic pressure. Without the hydraulic servo output mechanism according to the present invention, the control energy directly available from piston 20 within normal accuracy tolerances is of the order of magnitude of an ounce or less, whereas with said hydraulic servo mechanism the output force may readily be of an order of magnitude of 10 lbs. or more and may be varied by predetermined design as desired, the output force being a function of the pressure drop between inlet 14 and the dimension of the constricted outlet orifice 60 of the servo subassembly. Flow of the liquid under test in the servo portion of the assembly is from orifices 56 into bore 63, then through orifices 64 and 65 communicating through channel 66 with constricted outlet orifice 60. The cross sectional area of outlet orifice 60 is advantageously on the order of one-tenth the total cross sectional area of orifices 56, since the relative effective areas of orifice 60 and orifices 56, being arranged across a constant pressure drop, determine the hydraulic pressure differential between inlet 14 and area 63, i.e. the pressure difference generating output rod movement.

A further feature of the hydraulic servo subassembly presented in Figures 1 and 4 is that extension 57 of piston 20 is upwardly and inwardly tapered in the manner indicated. The purpose of such taper is to provide as small an upper surface cross section spanning orifices 56 as possible, consistent with durability, in order to limit any Venturi action or aspirating effect and consequent reduced downward pressure as respects that portion of extension 57 immediately adjacent to said orifices 56 as would otherwise be caused by the high velocity of the liquid across such portion of extension 57. Such reduced downward pressure, although of only secondary significance, is generally proportional to the area of the adjacent piston portion. If the cross sectional area of the upper lip of extension 57 were substantial, as compared with the total cross sectional area of piston 20, the effect of such intermittent aspiration as is occasioned by incremental movement of piston 20 and incremental follow-up of piston 51 would possibly be of consequence to the accuracy of the mechanical output signal on output rod 50, depending upon the accuracy requirement of a given installation. It will of course be readily understood by those skilled in the art that should accuracy tolerances permit, the tapered aspect of the design of piston extension 57 can be dispensed with, as desired.

It will be likewise readily understood that end housing 35 and partition plate 26 are suitably affixed to housing 21 in a manner clamping constricted orifice plate 28 therebetween, as by bolts 70 and 71, that upper end housing 72 and servo cylinder 73 are likewise clamped to housing 21 as by bolts 74 and 75, and that output rod 50 is suitably sealed against the hydraulic pressure of the liquid coursing the servo subassembly, as by packing 76 retained in gland 77 by packing bolt 78.

Fig. 5 is a somewhat simplified diagrammatic presentation of the viscosity sensing subassembly and hydraulic servo output subassembly typifying the present invention and illustrated in Figures 1 through 4, and the constant pressure differential regulator used in conjunction therewith, like numerals being used to designate the corresponding elements of Figures 1 through 4.

Giving specific consideration to the presentation of Fig. 5 in order to summarize and otherwise state the various principles and mode of operation of the present invention, the liquid under test enters the assembly by line 11, 13 and passes therethrough along the following three flow paths:

(a) Through the pressure differential regulator 10 comprising adjustable spring pressed valve 10′, over pressure liquid being delivered by bypass line 10″ to outlet 12.

(b) Through line 11, 13 into outer head area 33, around laminar flow section piston 20 through laminar flow section passageway 22, thence through orifices 34 in partition plate 26 to the constricted orifice formed by fixed orifice plate 28 and tapered pin 29, into outlet chamber 30, thence to return line 15 and outlet line 12.

(c) Through line 11, 13 to outer head area 33 and inner head area 53 through orifices 54, further flow being from outer head area 33 past piston extension 57, also identifiable as a servo control-valve-lip, through orifices 56, also identifiable as servo control-valve-ports, into chamber 63 then through orifices 64, 65 into channel 66 to constricted outlet orifice 60, then through outlet line 18 to return line 15 and outlet line 12.

The first of the above flow paths, through the constant pressure differential regulator 10, is maintained so that the pressure drop from outer head area 33 to outlet chamber 30 will remain at a predetermined constant level, determined by the adjustment of regulator 10.

The second above-mentioned flow path, through the viscosity sensing elements of the subassembly, varies the pressure drop across the laminar flow section passageway 22 in such a manner that piston 20 moves with or against the action of spring 23 as a function of the viscosity of the liquid under test. The instantaneous position of laminar flow section piston 20 then is a direct measure of the viscosity of the liquid. The instantaneous position of piston 20 for a particular viscosity depends upon the dimensions of laminar flow path 22, the instantaneous diameter of the constricted orifice formed by orifice plate 28 and tapered pin 29, the sensitivity or incremental range of the elements being determined by the tapered configuration of said pin 29, the compressive force of spring 23, and the magnitude of the total drop between outer head area 33 and outlet chamber 30.

The pressure drop across the variable constricted orifice formed by orifice plate 28 and tapered pin 29 is substantially independent of the liquid viscosity, and for a constant density liquid varies as the square of the rate-of-flow. The two pressure drops, i.e. through laminar flow passageway 22 and through the variable constricted orifice, necessarily is a constant sum because of the action of the constant pressure differential regulator 10. The pressure drop across the laminar flow section passageway 22 accordingly is increased and the pressure drop across the variable constricted orifice is decreased by a decrease in liquid flow resulting from an increased liquid viscosity.

If tapered pin 28 were not so tapered, laminar flow section piston 20 would move down against spring 23 in an approximately linear manner. Since a change in pin size would alter the resistance to liquid flow, an appropriately tapered pin 29 will allow nonlinear movement of laminar flow section piston 20 with change in liquid viscosity, and a greater or lesser movement of piston 20 with a given change in viscosity. Further, by appropriate taper along all or a portion of pin 29 this action can be made unstable so that with a small decrease in viscosity the piston 20 will, without further change in viscosity, move piston 20 a distance determined by the length of the unstable portion of such pin and the piston will not then be restored to its initial position with an increase in viscosity until a predetermined incremental increase in viscosity has occurred, the piston 20 then returning without further increase in viscosity to a point where a stable segment of said pin 29 again spans orifice plate 28.

Such a tapered pin having an unstable segment is presented in Fig. 6, hereinafter discussed.

The third of the above-mentioned flow paths, through the hydraulic servo mechanism of the assembly, causes output rod 50 to follow the motion of laminar flow section piston 20, against any resistance thereto quantitatively below a maximum determined by the pressure drop between outer head area 33 and outlet 16, without interfering with the viscosity sensing action of laminar flow piston 20.

Piston 51, otherwise identifiable as a servo piston, fits servo subassembly cylinder 73 closely so that it moves easily in said cylinder but liquid flow around it is negligible. The forces that position said piston 51 are the difference in pressure between outer head area 33 and inner head area 53 on one hand and the force of spring 55 and the instantaneous pressure existing in area 63 and channel 66, on the other hand, the friction load on output shaft 50 being disregarded. The pressure in area 63 and channel 66 is controlled by liquid flow through the following path. If piston 51 is positioned too high, orifices 56 are open too wide with a comparatively small pressure drop across them and the piston 51 moves down by the force of spring 55 and the increased hydraulic pressure in area 63 and channel 66. If piston 51 is positioned too low, tapered extension 57 on the head of piston 20 tends to cover the orifices 56, causing a large resistance to liquid flow therethrough with comparatively little resistance at orifice 60, a decrease in hydraulic pressure in area 63 and channel 66 resulting. The piston 51 then moves upwardly until the equilibrium condition is again established.

Thus, piston 51 is constrained to follow laminar flow section piston 20, with extension 57 of the latter partially covering orifices 56.

Fig. 6 presents a detailed view of a modified form of tapered pin, designated 29′. Such modified form of tapered pin has a threaded portion 80 so that the same is mountable on shaft 31 in lieu of tapered pin 29, and is further provided with a stable taper along portion or segment 81 thereof and an unstable taper along portion or segment 82 thereof.

As will be evident to those skilled in the art, with a laminar flow section of given dimensions, and with an orifice plate 28 having a fixed orifice of a given dimension, a tapered pin of relatively small slope will merely reduce the incremental range of the viscosity sensing elements, such reduction in range being from a total range of say 2 to 8 centipoises with an untapered pin to a range of from 6 to 8 centipoises with a pin of uniform taper as shown in the embodiment first presented. As the slope of the taper of pin 29, measured from the longitudinal axis thereof, is increased, such incremental range will be further reduced until the incremental range of the viscosity sensing subassembly is substantially zero, which critical taper slope will then be identified with a critical viscosity value. At such point of criticality, when the viscosity of the liquid coursing through the viscosity subassembly exceeds or falls below such critical value, the laminar flow section piston 20 is shifted without further change in viscosity from an uppermost position to a lowermost position or vice versa, as the case may be. Taper slopes of pin 29 at and above such critical slope are obviously unstable insofar as the viscosity sensing action of laminar flow section piston 20 is concerned. According to the present invention, however, such instability is utilized to advantage by rendering only a portion of the tapered extent of pin 29' of an unstable slope so that incremental changes in viscosity of the liquid under test are sensed by the viscosity sensing subassembly along the stable portion 81 of tapered pin 29' and, when the viscosity of the liquid under test reaches a predetermined maximum, further movement of laminar flow section piston 20 places an unstable taper section 82 across constricted orifice plate 28, at which point laminar flow section piston 20 will "snap" downwardly to an extreme throw position and generate a more positive corrective signal in terms of downward movement of output rod 50.

Provision of a stable segment and an unstable segment along the length of a tapered pin, such as is illustrated in Fig. 6 by way of non-limitive example, illustrates how a snap-action output from the viscosity sensing subassembly is achieved. In a given installation, wide flexibility in mode of operation is available, since the nature of the movement of the laminar flow section piston can be varied merely by substitution of a tapered pin of an appropriate taper configuration.

As will be apparent, wide variation in taper configurations of further modified forms of tapered pins, in order to achieve any desired mode of snap action output from or nonlinearity of the viscosity sensing subassembly, can be readily determined. Thus, a given tapered pin can be provided with an unstable tapered or stepped section at both ends of its throw and/or can be provided with segments of varying stable taper and/or with an untapered segment, as desired.

From the foregoing various arrangements and embodiments of the present invention, and principles and modes of operation set forth with respect thereto, it will be seen that various other modifications thereof may be undertaken within the skill of the art within the scope of the present invention, as set forth in the following claims.

What is claimed is:

1. Mechanism for sensing the viscosity of a pressurized liquid, comprising, duct means forming a flow path for flow of liquid whose viscosity is to be sensed, a constant pressure differential regulator for maintaining a constant liquid pressure differential from end to end of said duct means, said duct means forming first and second sections in series flow relation therein, an element in one of said sections movable in response to the relative viscosity of the liquid, a constricted orifice of variable cross sectional area in the other of said sections, and means for varying the area of said orifice in response to the relative movement of said movable element.

2. Mechanism according to claim 1, means operatively connected to said movable element for positioning an output shaft responsive to the viscosity of liquid flowing in said duct means.

3. Mechanism according to claim 2 wherein said variable area orifice comprises a fixed orifice having a tapered pin therein, said tapered pin being connected to and moved by said movable element.

4. Mechanism for sensing the viscosity of a pressurized liquid, comprising duct means forming a path for flow of liquid whose viscosity is to be sensed, a constant pressure differential regulator for maintaining a constant liquid pressure differential from end to end of said duct means, said duct means forming first and second sections in series flow relation therein, a piston in one of said sections movable in response to the relative viscosity of the liquid, a constricted orifice of variable cross sectional area in the other of said sections, and means for varying the relative area of said orifice in response to the relative position of said movable piston.

5. A mechanism according to claim 4, wherein said constricted orifice is varied in cross sectional area by movement of said piston.

6. A mechanism according to claim 5, wherein such variable area constricted orifice comprises a fixed orifice having a tapered pin arranged therein, said tapered pin being mechanically connected to and moved by said piston.

7. Mechanism according to claim 6, wherein the taper of at least a segment of said pin is such that when the viscous drag on said piston increases, said piston moves said pin and decreases the cross sectional area thereof in said fixed orifice, the effective cross sectional area of said orifice thereby being increased, thus rendering said piston more sensitive to incremental changes in viscosity and amplifying the degree of movement of said piston occasioned by an incremental change in viscosity of the liquid under test.

8. Mechanism according to claim 7, wherein at least a segment of said tapered pin is provided with a taper having a slope sufficient to render the viscosity responsive action of said piston unstable through at least a portion of its throw, thereby producing a more positive piston movement at a predetermined viscosity value.

9. Mechanism according to claim 4, wherein the position of said piston controls hydraulic servo means utilizing the inlet pressure of the liquid under test to generate a high energy mechanical output following movement of said piston.

10. Mechanism according to claim 9, wherein said hydraulic servo means is connected in parallel with said series connected and variable constricted orifice across said constant pressure differential regulator.

11. Mechanism according to claim 9, wherein said hydraulic servo means comprises a servo piston having a head portion interfitting in a bore provided in said piston, said servo piston being urged toward said piston and provided with an interior bore laterally communicating with the inlet area of the liquid under test by means of at least one orifice partially constricted by an extension of said piston, said interior bore further communicating through a constricted outlet with the low pressure side of said differential regulator.

12. Mechanism according to claim 9, wherein said hydraulic servo means comprises an output rod connected to a servo piston in turn having a head portion interfitting in a cylinder provided in said piston, said servo piston being spring pressed toward said piston and provided with an interior bore laterally communicating with the inlet area of the liquid under test by means of orifices partially constricted by a tapered extension of said piston, said interior bore further communicating through a constricted outlet with the low pressure side of said differential regulator, the pressure drop across said partially constricted orifices determining the force exerted on said output rod.

13. In combination with a viscosimeter having an element thereof movable in response to change in liquid viscosity, hydraulic servo means comprising liquid inlet and outlet means, means for delivering liquid under pressure to said inlet, a constant pressure differential regulator for maintaining a constant liquid pressure differential between said inlet and outlet means, and means responsive to movement of said movable element for generating from liquid inlet pressure a high energy level mechanical output movement.

14. Mechanism according to claim 13, wherein said movable element is a piston.

15. Mechanism according to claim 14, wherein said hydraulic servo means further comprises a servo piston having a head portion interfitting in a bore provided in said piston, said servo piston being urged toward said piston and provided with an interior bore laterally communicating with the inlet area of the liquid under test by means of at least one orifice partially constricted by an extension of said piston, said interior bore further communicating through a constricted outlet.

16. Mechanism according to claim 14, wherein said hydraulic servo means further comprises an output rod connected to a servo piston in turn having a head portion interfitting in a bore provided in said piston, said servo piston being spring pressed toward said piston and provided with an interior chamber laterally communicating with the inlet area of the liquid under test by means of orifices partially constricted by a tapered extension of said piston, said interior chamber further communicating with a constricted outlet, the pressure drop across said partially constricted orifices determining the force exerted on said output rod.

17. Mechanism for sensing the viscosity of a liquid comprising means delivering said liquid under pressure, means establishing a substantially constant pressure drop in said liquid, a first section through which at least a portion of said liquid passes, said first section having an element movable in response to change in viscosity of said liquid, and a constricted orifice in series flow path with said first section across said means establishing a substantially constant pressure drop, the cross sectional area of said constricted orifice being controlled by and varying in response to the relative position of said first section movable element in a manner enlarging or reducing said constricted orifice area when the liquid viscosity respectively increases or decreases.

References Cited in the file of this patent
UNITED STATES PATENTS

| | | |
|---|---|---|
| 1,743,620 | Quiroz et al. | Jan. 14, 1930 |
| 2,012,550 | Powis | Aug. 27, 1934 |
| 2,068,973 | Booth | Jan. 26, 1937 |
| 2,194,605 | Mapel | Mar. 26, 1940 |